June 3, 1969

R. F. TOWNSEND 3,447,293

MECHANICAL HARVESTER FOR FRUIT TREES

Filed Sept. 17, 1965

Ray F. Townsend
INVENTOR.

BY *Clarence A. O'Brien*
and *Harvey B. Jacobson*
Attorneys

June 3, 1969 R. F. TOWNSEND 3,447,293
MECHANICAL HARVESTER FOR FRUIT TREES
Filed Sept. 17, 1965 Sheet 2 of 3

Ray F. Townsend
INVENTOR.

BY Clarence A. O'Brien
and Harvey B. Jacobson
Attorneys

June 3, 1969 R. F. TOWNSEND 3,447,293
MECHANICAL HARVESTER FOR FRUIT TREES
Filed Sept. 17, 1965 Sheet 3 of 3

Ray F. Townsend INVENTOR.

BY Clarence A. O'Brien
and Harvey B. Jacobson
Attorneys

United States Patent Office 3,447,293
Patented June 3, 1969

3,447,293
MECHANICAL HARVESTER FOR FRUIT TREES
Ray F. Townsend, Dade City, Fla., assignor to Townsend Harvester Corporation, a corporation of Florida
Filed Sept. 17, 1965, Ser. No. 488,094
Int. Cl. A01g 19/00
U.S. Cl. 56—328          6 Claims

ABSTRACT OF THE DISCLOSURE

A mechanical harvester that has a pair of rakes reciprocally mounted on an elevating frame. When the rakes are reciprocated toward the fruit area of a tree the rakes open and remain open through the entire inward travel thereof. At the end of the travel, the rakes close and are held closed throughout the outward travel of the rakes, thereby pulling the fruit off the tree.

---

The present invention generally relates to a harvesting mechanism and more particularly a mechanical harvester for harvesting fruit from fruit trees and is primarily intended for use in harvesting citrus fruit although other fruits could be harvested by the use of the present invention.

Heretofore, most tree fruits have been harvested by the use of manual labor having picking bags to contain the harvested fruit until it is placed in a container, box or the like. When picking fruit from a mature tree or at heights above the normal reach of a person standing on the ground, ladders are used. Such ladders are quite cumbersome to place in position and are rather unstable and also often cause damage to the tree thus not only reducing the efficiency of the persons picking the fruit but requiring additional expenditures in initially obtaining the ladders and other equipment.

The conditions encountered when picking citrus tree fruit vary considerably due to variation in tree size, shape and foliage density and also varies due to tree variety and seasonal growing conditions, production practices and the like. In some instances, tree fruit is harvested after a new crop of fruit is formed on the tree.

Accordingly, it is an object of the present invention to provide a mechanical harvester for harvesting tree fruit from fruit trees capable of being adjusted and controlled to adapt to the wide range of harvesting conditions which may be encountered. Basically, the mechanical harvester and the methods and procedures employed are such that a minimum of damage occurs to the fruit tree and the fruit picked therefrom during the harvesting operation. Also, the harvester is capable of being operated by a minimum number of personnel and the structural details of the harvesting mechanism is such that adjustments and repairs can be made in the field by personnel now trained to operate similar agricultural production and harvesting equipment thus eliminating the necessity of highly specialized personnel to repair or adjust the harvesting mechanism.

Another object of the present invention is to provide a fruit harvester having a relatively wide range of operation and being fully capable of operation from a position near ground level to a height of sixteen to twenty feet in order to pick fruit from the top portion of a mature tree together with efficient control mechansims to enable variation in angular relation and proximity of the harvester to the fruit being harvested. The harvester of the present invention provides a structure that will enable a tensile force to be exerted on the fruit being harvested. Generally, in picking citrus fruit, a tensile force of two to fifteen pounds is required to separate each fruit from its stem. It is essential that this force be applied in the plane of and generally along the longitudinal axis of the tree limb in order to avoid excessive bending or breaking of the tree limb which may result from the combined force required to separate a number of fruit from their stems in the event the force is applied in a direction other than that of the longitudinal axis of the tree limb. Also, each fruit must be moved a distance of from two to twelve inches or more to absorb bending of the tree limbs before the force necessary to separate the fruit from the stem can be exerted. The harvester of the present invention is capable of introducing this movement and force sufficient to separate the fruit and the direction and proximity of the harvester is controllable so that the tree is not damaged and the fruit is picked with a minimum of movement by the harvester.

A further object of the present invention is to provide a mechanical harvester for tree fruit that is capable of adjustment for harvesting different varieties of citrus fruit and for harvesting mature fruit without excessive damage to any of the immature fruit which may be on the tree at the time the mature fruit is being harvested. Further, the harvester of the present invention is capable of being attached to and utilized with any conventional variety of agricultural tractor, orchard tractor or the like which are normally used in citrus fruit orchards or groves.

Yet another feature of the present invention is to provide a mechanical harvester, fruit tree having means incorporated thereon for conveying the harvested fruit from the point of removal from the tree to a container for subsequent transportation to a processing plant.

Generally, the object of the present invention are accomplished by a mechanism composed of two oscillating rakes which enter the tree foliage in an open position, close and then are retracted from the foliage in a closed position. Oscillation of the two rakes is accomplished by double-acting fluid pressure operated cylinder assemblies which open the opposed rakes before entering the tree foliage and prevent the rakes from opening during the closed retraction cycle. Entry and retraction of the rakes is accomplished by a crankshaft rotated by a geared motor or by any other suitable means. The tines or teeth of the oscillating rakes may be varied in clearance and separation and the stroke of the actuating crankshaft or other mechanism may be varied over a wide range of fruit harseting conditions. The harvesting mechanism is mounted on a vertically orientated lift mechanism which may be attached to a conventional orchard-type tractor or the like with the mechanism including control means for adjusting its angular relation and proximity to the fruit being harvested while the radial relation of the harvester mechanism to the citrus tree itself is controlled by the tractor operator. Thus, two operators are employed with the tractor operator controlling the radial relation of the harvester to the tree and the elevation, angular relation and proximity of the harvester to the tree is controlled by the harvester operator. Even though accurate control and adjustment is provided, the structure involved is still relatively simple to operate, maintain and repair and is not only efficient but relatively inexpensive in manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
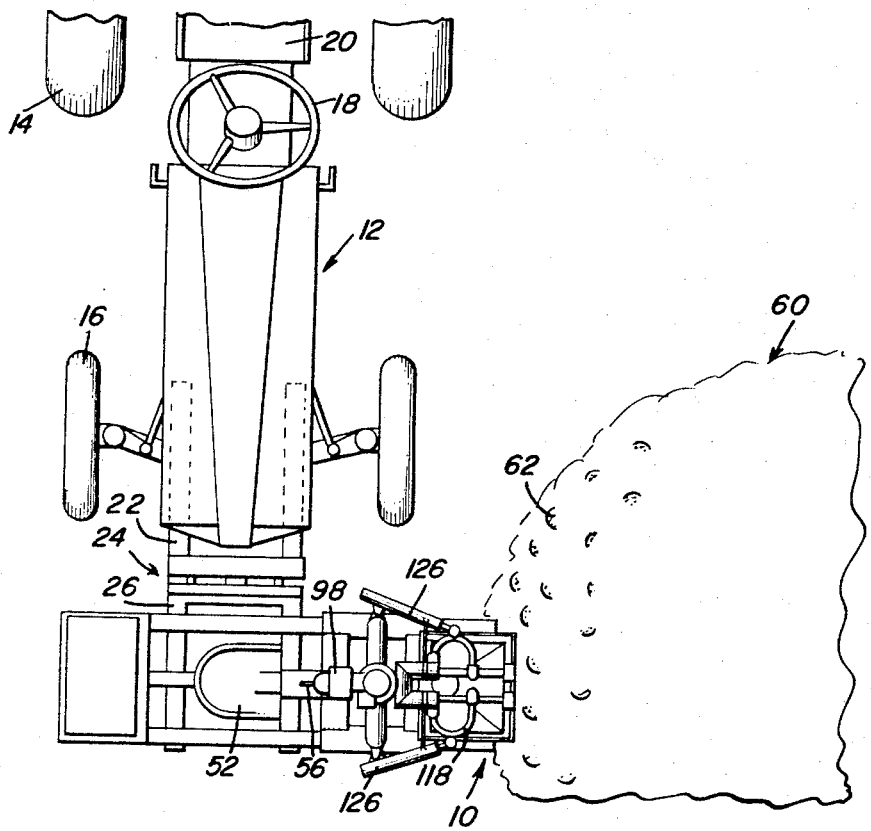
FIGURE 1 is a diagrammatic top plan view of the mechanical harvester of the present invention illustrating its relationship to a fruit tree.
Figure 2:
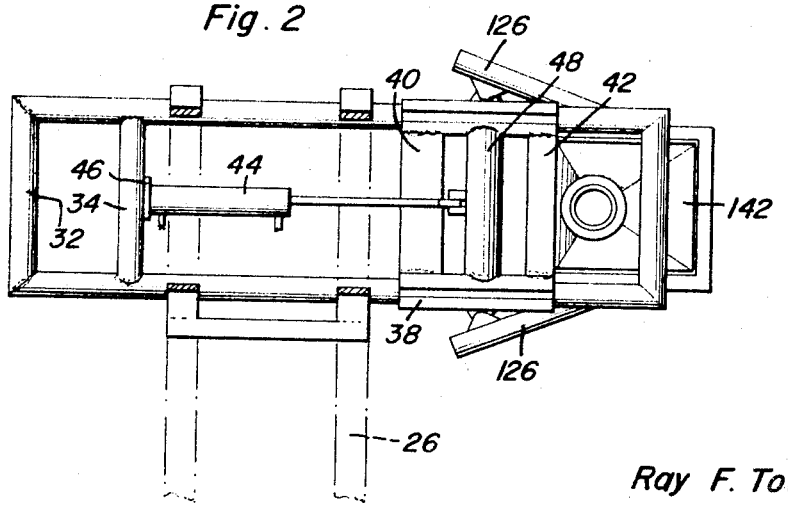
FIGURE 2 is a bottom plan view of the support structure for the harvesting mechanism.

Referring now specifically to the drawings, the harvester of the present invention is generally designated by the numeral 10 and is mounted on a tractor generally designated by the numeral 12 with the tractor being preferably a conventional orchard-type tractor or the like currently employed in orchards, citrus tree groves and the like. The tractor 12 includes the usual rear traction wheels 14, front steerable wheels 16, steering wheel 18, operator's seat 20 and a supporting framework 22 attached to the forward end thereof and extending forwardly from the tractor together with a lift mechanism 24 for moving a pair of forwardly extending forks 26 so that the forks can be moved in a vertical direction in front of the tractor to raise and lower the harvesting mechanism 10 which is supported therefrom. Attached to the forks 26 is a generally rectangular frame 28 constructed of tubular pipe or the like and supported from the forks 26 by upstanding brackets 30. The frame 28 includes end members 32 and intermediate transverse members 34 and is orientated generally with the longer portion thereof projecting to one side of the lift forks 26.

Mounted on the frame 28 is a slidable frame generally designated by numeral 36 which forms a support for the harvesting mechanism 10 and the slidable frame 36 includes partial cylindrical edge members 38 interconnected by a pair of connecting plates 40 and 42 which extend between the cylindrical edge members 38 and in generally tangential relation to the upper surface thereof. The cylindrical members 38 are constructed so that they will slide past the upstanding brackets 30 which support the frame 28 from the lift forks 26 so that the lateral positioning of the harvesting mechanism 10 in relation to the lift forks 26 may be varied.

For the purpose of extending and retracting the slidable frame 36, a piston and cylinder assembly 44 has one end thereof connected to one of the cross members 34 as at 46. The other end of the piston and cylinder assembly 44 is connected to a transverse tubular member 48 by pin or bolt 50.

Figure 5:
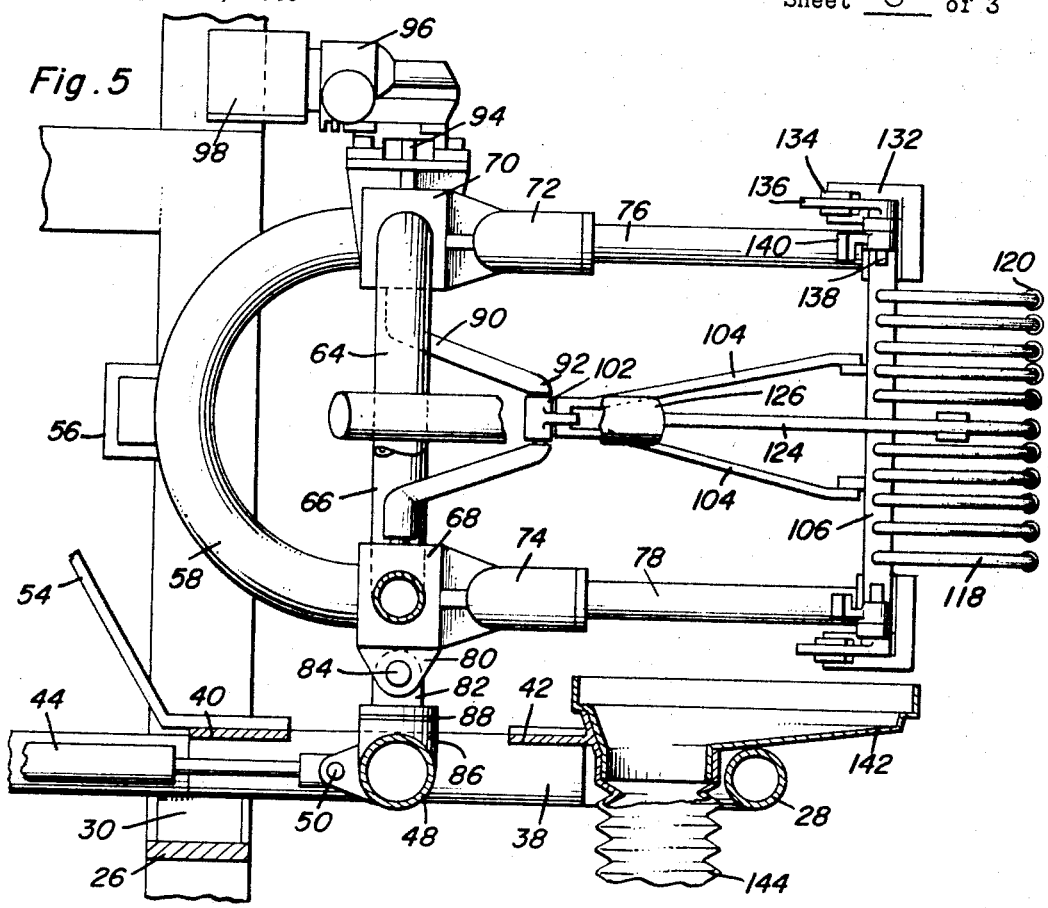
FIGURE 5 is a side elevational view of the structure of FIGURE 3 with parts broken away for clarity.

An operator's seat 52 is supported by a bracket 54 which extends upwardly and laterally of the plate 40 as illustrated in FIGURE 5 with the operator's seat being such that a suitable control handle 56 is in position for grasping by the operator. The handle 56 is mounted centrally of a generally U-shaped frame member 58 having the handle 56 attached to the bight portion thereof and with the legs of the U-shaped member being orientated in substantially the same vertical plane and extending generally horizontally towards the tree from which the fruit is being harvested. The fruit tree is generally designated by numeral 60 while the citrus fruit is designated by numeral 62.

Figure 3:
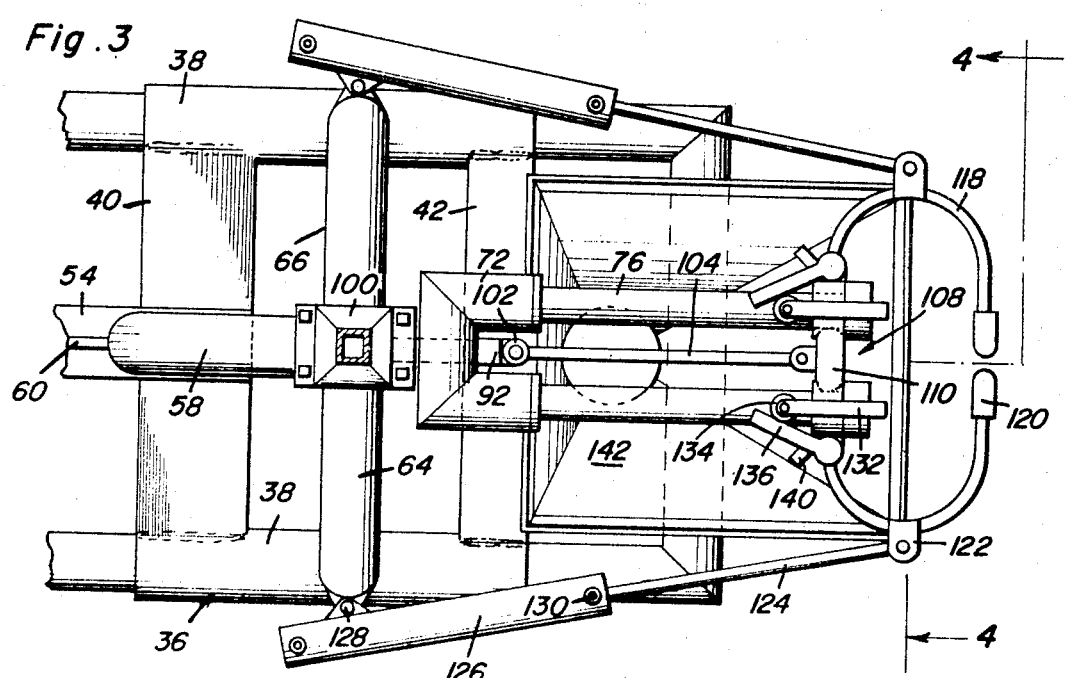
FIGURE 3 is a top plan view, on an enlarged scale, of the picker structure.
Figure 4:
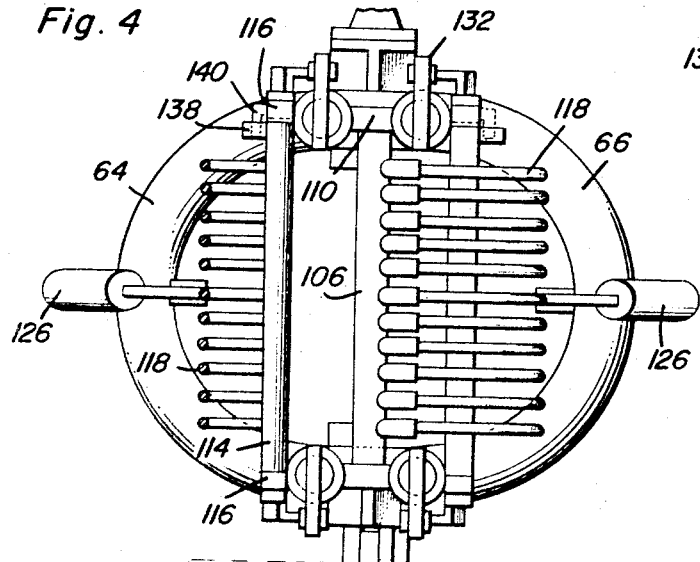
FIGURE 4 is a front elevational view, with portions in section taken along section line 4—4 of FIGURE 3 illustrating further structural details of the picker rakes.
Figure 7:
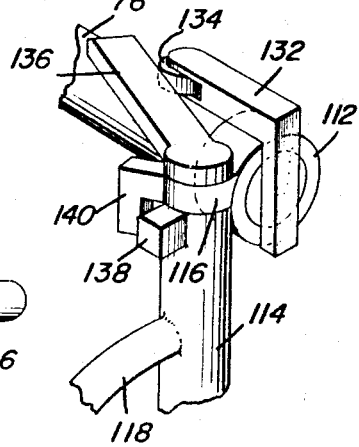
FIGURE 7 is a fragmentary perspective view illustrating the means for camming the rake tines to a closed position and the stop members limiting the outward movement of the harvesting rakes.

Rigid with the U-shaped member 58, there is provided a pair of vertically orientated inwardly opening U-shaped members 64 and 66 which are in the same transverse horizontal plane but perpendicular to the U-shaped member 58 as illustrated in FIGURE 3. The lower ends of the U-shaped members 58, 64 and 66 are interconnected by an adapter fitting 68 while the upper ends of the same members are interconnected by a fitting 70 thus forming a rigid framework. Projecting outwardly from the adapter fitting 70 is a tubular U-shaped fitting 72 and projecting from the fitting 68 is a similar U-shaped fitting 74 having parallel guide members 76 connected with the fitting 72 and parallel guide members 78 connected with the U-shaped fitting 74. Thus, parallel upper and lower pairs of guide members 76 and 78 are supported rigidly in relation to the U-shaped members 58, 64 and 66 so that manipulation thereof may be accomplished by using the handle 56 inasmuch as the lower fitting 68 is supported from the transverse tubular member 48 of the slide frame 36 for universal relative movement. This support is accomplished by depending lugs 80 on the adapter fitting 68 which is connected to a supporting member 82 by virtue of a pivot pin 84 which enables pivotal movement about a generally horizontal axis. The supporting member 82 is attached to a supporting adapter 86 rigidly fixed to the tube 48 for swivelling movement by a conventional swivelling joint at 88 thus enabling the rigid framework formed by the U-shaped members 58, 64, 66, fittings 72 and 74 and guide members 76 and 78 to pivot about substantially a horizontal axis defined by the pivot pin 84 and about a vertical axis formed by the swivel joint 88. The construction of the various frames and other components described is substantially conventional in that pipe elements are employed with suitable fittings or welding to be employed for securing the various components together.

Journalled between the lower fitting 68 and the upper fitting 70 is a crankshaft 90 having a single eccentric crank 92 thereon and the upper end of the crankshaft 90 is drivingly connected with the output shaft 94 of the reduction gear 96 of an electric motor assembly 98. The reduction gear 96 is drivingly connected to a supporting bracket or adapter 100 which supports this assembly on the upper fitting 70 for driving the crankshaft 90 at a desired speed which may be adjusted or which may be preset. The combined motor and gear head is a conventional structure and may be in the form of an electric motor, air motor, hydraulic motor or the like.

Attached to the offset crank 92 on the crankshaft 90, there is provided a yoke 102 having forwardly extending rods 104 pivotally connected thereto. The rods 104 are in the form of connecting rods which move in unison and which have their forward ends connected to a vertical member 106 of a reciprocating frame 108 which also includes a top and bottom transverse member 110 having sleeves 112 on the ends thereof which are slidable on the guide members 76 and 78, respectively.

Pivotally attached to each pair of sleeves 112 and on the outer edge thereof is a vertical supporting rod 114 having reduced ends thereof journalled in outwardly extending supporting lugs 116 rigid with the sleeves 112. Attached to each supporting rod 114 is a plurality of vertically spaced U-shaped rods or tines 118 which combine to serve as rakes for raking the fruit 62 from the tree 60 in a manner described hereinafter. The ends of the tines 118 may be provided with covering elements 120 of resilient material such as plastic or the like or at least the ends of the tines 118 are rounded to reduce or eliminate injury to the fruit.

Attached to the center or bight portion of each set of tines 118 is a lug 122 having a piston rod 124 pivotally attached thereto with the piston rod 124 extending into a cylinder 126 and provided with a suitable piston thereon so that the piston rod 124 may be reciprocated in relation to the cylinder 126. The cylinder 126 is attached to the member 64 by a suitable pivoting connection such as a bracket and pin illustrated at 128. Similar piston and cylinder assemblies are orientated on both sides of the harvesting mechanism and each of the cylinders includes adjustable valves 130 at each end thereof to enable controlled air exhaust while enabling substantially unrestricted air inlet so that the piston and cylinder assemblies act as retarding mechanisms for retaining the tines in their open position during outward movement of the tine carrying frame 108 and retaining the tines in closed position during the inward movement thereof.

Figure 6:
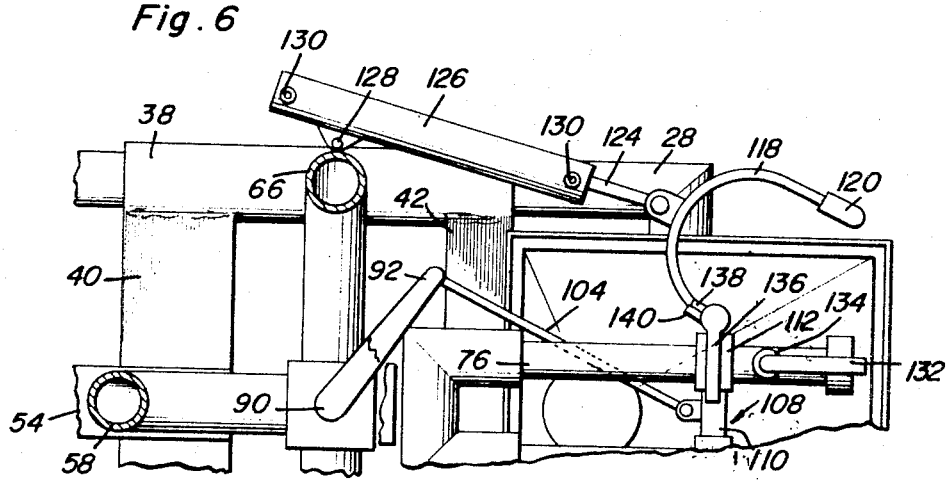
FIGURE 6 is a fragmentary top plan view of one side of the picking structure illustrating the picking rakes in intermediate position.

A cam mechanism is provided for positively closing the tines to their raking position so that when they are retracted, the fruit will be raked or pulled from the tree. This cam mechanism includes a rigidly mounted bracket 132 at the end of each guide member 76 and 78 with the bracket extending longitudinally inwardly from the end thereof and having a roller 134 journalled thereon. The roller is disposed in the path of movement of a laterally extending arm 136 that is rigid with the upper and lower end of each supporting rod 114 and will move the supporting rod 114 in response to pivotal movement of the arm 136. Also, a stop lug 138 is rigidly fixed to the support rod 114 for engagement with a stop member 140 rigidly fixed to the attaching lug 116 which will limit the degree of opening movement of the tines 118 to generally the position illustrated in FIGURE 6 so that the tines will enter the tree in open position.

A collection pan or tray 142 is supported from the frame 28 in underlying relation to the cage area formed by the tines when the rakes or tines are retracted for receiving the fruit as it drops from the interior of the cage formed by the tines or rakes. The tray 142 is connected to a suitable tubular member such as a flexible bellows pipe 144 by any suitable structure with this tube extending downwardly to a supporting structure attached to the tractor or other container for receiving the fruit being picked. The construction of the tubular member 144 may be such that it will retard the flow of the fruit.

The oscillating rakes or tines 118 are reciprocally guided on the guide members 76 and 78 with the reciprocation being caused by the crankshaft 90 and the connecting rods 104, as the motor 98 rotates the crankshaft 90. With the structure in the position illustrated in FIGURE 3, the entire frame 108 will be pulled inwardly. As this occurs, inward movement of the piston attached to the end of the piston rod 124 will compress air within the cylinder 126 and due to the controlled exhaust through the adjustable valve 130 at the rear of the cylinder 126, the resistance to inward movement caused by this compression of air will securely retain the rakes in closed position during their inward movement thus serving to pull the fruit 62 from the tree. When the rakes are in their innermost position, the crankshaft will reverse their direction of movement and then move the frame 108 outwardly. At this point, the air entrapped between the forward end of each cylinder 126 and the piston therein will be compressed thus assuring that the tines 118 will be opened. This open condition of the tines will be retained during the forward movement of the frame 108 and the restricted discharge of air will enable the tines 118 to move forwardly inasmuch as the stop lug 138 engaging the stop member 140 will limit the outward opening movement of the tines 118. Then as the frame 108 approaches the outer end of its movement, the leading edge of the arms 136 on the support rod 114 will engage the roller 134 and be cammed about the pivot axis of the rods 114 thus moving the tines or rakes 118 inwardly into closed position after the tines or rakes have been pushed into the tree into the area from which the fruit is to be pulled.

The position of the slide frame may be adjusted by the piston and cylinder assembly 44 by a suitable control and this may be a pneumatic cylinder, hydraulic cylinder or the like and suitable control apparatus may be provided therefor. This is also true of the electric motor or other suitable motor for reciprocating the rake structure. Thus, the operator will effectively orientate the rakes for pulling the citrus fruit from the tree and the mounting of the rigid framework which supports the reciprocating rake structure will be generally balanced in nature so that a relatively small force need be applied at the handle 56 for controlling the postion of the rake.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mechanical harvester for removing fruit from trees comprising: at least a pair of opposed rakes, means supporting said rakes for reciprocal movement into and out of the fruit area of a tree, means operatively associated with said rakes for opening the rakes during inward movement thereof and closing the rakes at the end of the inward movement, said last mentioned means including further means for retaining the rakes open during the inward movement thereof including an automatic control device which will hold the rakes open while enabling inward movement thereof and retaining them closed during their outward movement whereby the rakes will remove fruit from the tree.

2. The structure as defined in claim 1 wherein each of said rakes includes a plurality of generally U-shaped tines orientated in substantially horizontal planes and spaced apart to enable mature fruit to be removed from the tree while leaving immature fruit thereon.

3. The structure as defined in claim 2 wherein said means for closing the tines during the last portion of their movement toward the tree includes a roller mounted on said support means, each rake having an offset arm connected thereto for engagement with the roller at the end of movement of the rake toward the tree for pivoting the rake towards its closed position in a positive manner to overcome the pneumatic cushion holding the rake open.

4. A harvester for tree fruit comprising a lift mechanism, means supporting the lift mechanism for orientation in different radial positions around a tree and vertically elevating the lift mechanism, a framework supported by the lift mechanism, a movable frame carried by the framework on the lift mechanism for sliding movement toward and away from a tree, a fruit harvesting mechanism mounted on the sliding frame for universal pivotal movement, control means for controlling the position of the harvesting mechanism, said harvesting mechanism including a pair of oscillating rakes with means to reciprocate them in relation to the tree and means to simultaneously open them during movement towards the tree and close them at the end of their movement towards the tree and remain closed during their outward movement for raking fruit outwardly of the tree, and means underlying the rakes at the area defined by the outer end portion of their movement to receive fruit pulled from the tree.

5. A harvester for tree fruit comprising a lift mechanism, means supporting the lift mechanism for orientation in different radial positions around a tree and vertically elevating the lift mechanism, a framework supported by the lift mechanism, a movable frame carried by the framework on the lift mechanism for sliding movement toward and away from a tree, a fruit harvesting mechanism mounted on the sliding frame for universal pivotal movement, control means for controlling the position of the harvesting mechanism, said harvesting mechanism including a pair of oscillating rakes with means to reciprocate them in relation to the tree and means to simultaneously open them during movement towards the tree and close them at the end of their movement towards the tree and retain them closed during their outward movement for raking fruit outwardly of the tree, means underlying the rakes at the area defined by the outer end portion of their movement to receive fruit pulled from the tree, said means for retaining the rakes in closed position including an automatic control device operatively interconnected between a stationary part of the mechanism and the tines.

6. The structure as defined in claim 5 wherein said means for reciprocating the rakes towards and away from the tree includes a crankshaft operatively connected with the rakes, and power means for driving the crankshaft at a predetermined rotational speed.

References Cited

UNITED STATES PATENTS

| | | | |
|---|---|---|---|
| 394,550 | 12/1888 | Ansley | 56—333 |
| 774,793 | 11/1904 | Sharp | 56—334 |
| 831,181 | 9/1906 | Ohman | 56—330 |
| 1,676,088 | 7/1928 | Holmes | 56—243 |
| 3,120,091 | 2/1964 | Gould et al. | 56—328 |
| 3,347,587 | 10/1967 | Frost | 56—328 |

ABRAHAM G. STONE, *Primary Examiner.*

PASQUALE A. RAZZANO, *Assistant Examiner.*